United States Patent
Chmelar et al.

(10) Patent No.: US 11,906,006 B2
(45) Date of Patent: Feb. 20, 2024

(54) SELF-ACTIVATED NO-BACK DEVICE

(71) Applicant: HONEYWELL INTERNATIONAL INC., Charlotte, NC (US)

(72) Inventors: Jakub Chmelar, Brno (CZ); Jiri Berjak, Brno (CZ); Ronald Vaughan, Tempe, AZ (US); Tomas Ripel, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 259 days.

(21) Appl. No.: 17/497,396

(22) Filed: Oct. 8, 2021

(65) Prior Publication Data
US 2023/0115546 A1    Apr. 13, 2023

(51) Int. Cl.
| F16D 55/38 | (2006.01) |
| F16D 65/02 | (2006.01) |
| F16D 59/02 | (2006.01) |
| F16D 55/04 | (2006.01) |
| F16D 125/38 | (2012.01) |

(52) U.S. Cl.
CPC ............ *F16D 59/02* (2013.01); *F16D 55/04* (2013.01); *F16D 55/38* (2013.01); *F16D 65/028* (2013.01); *F16D 2125/38* (2013.01)

(58) Field of Classification Search
CPC .......... F16D 65/18–186; F16D 65/028; F16D 55/00–04; F16D 59/00–02; F16D 2125/34–38; F16D 55/26–44
See application file for complete search history.

(56) References Cited

U.S. PATENT DOCUMENTS

| 3,011,605 | A | | 12/1961 | Hungerford, Jr. et al. |
| 3,119,480 | A | | 1/1964 | Fuchs |
| 3,201,086 | A | | 8/1965 | Dalton |
| 3,335,831 | A | | 8/1967 | Kalns |
| 3,667,578 | A | | 6/1972 | Johnson |
| 4,176,733 | A | * | 12/1979 | Twickler ................. F16D 67/00 188/134 |
| 4,480,733 | A | | 11/1984 | Grimm et al. |
| 4,579,201 | A | | 4/1986 | Tiedeman |
| 4,597,477 | A | * | 7/1986 | Miller ..................... F16D 59/00 188/134 |
| 4,693,349 | A | | 9/1987 | Tysver |
| 4,850,458 | A | | 7/1989 | Allan et al. |
| 6,814,191 | B2 | | 11/2004 | Christensen |
| 6,974,015 | B2 | | 12/2005 | Gamache |
| 7,128,193 | B2 | | 10/2006 | Murakami |

(Continued)

*Primary Examiner* — Ernesto A Suarez
*Assistant Examiner* — Lillian T Nguyen
(74) *Attorney, Agent, or Firm* — Lorenz & Kopf LLP (57) ABSTRACT

A self-activated no-back device includes a housing, an input shaft, an output shaft, a reactor hub, first grooves, a brake hub, second grooves, a plurality of balls, a reactor plate, a brake pack, a reactor spring, and a load spring. The first grooves are formed on an interior side of the reactor hub interior side, and the second grooves are formed in an interior side of the brake hub. Each second groove is aligned with a different first groove to define a plurality of groove pairs. Each ball is positioned in a different one of the groove pairs. One side of the reactor plate contacts the reactor hub. The brake pack is selectively contacted by the brake hub. The reactor spring supplies a spring force to the reactor plate, and the load spring supplies a spring force to the brake pack.

19 Claims, 8 Drawing Sheets

(56) References Cited

U.S. PATENT DOCUMENTS

| | | |
|---|---|---|
| 8,511,441 B2 | 8/2013 | Lang et al. |
| 9,255,632 B2 | 2/2016 | Finney |
| 9,350,214 B2 | 5/2016 | Riegler |
| 9,527,580 B2 | 12/2016 | Lang et al. |
| 10,935,115 B2 | 3/2021 | Barger et al. |
| 2002/0101106 A1 | 8/2002 | Kim et al. |
| 2014/0138482 A1* | 5/2014 | Lang ................ F16D 55/38 244/99.9 |
| 2016/0223038 A1* | 8/2016 | Murphy ............ F16D 67/00 |
| 2016/0297514 A1 | 10/2016 | Turpin et al. |
| 2020/0189723 A1 | 6/2020 | Bae et al. |
| 2020/0377063 A1 | 12/2020 | Gaile |

* cited by examiner

SELF-ACTIVATED NO-BACK DEVICE

TECHNICAL FIELD

The present disclosure generally relates to a device that prevents back driving a torque source, such as a motor, and more particularly relates to such a device that is self-activated.

BACKGROUND

No-back devices may be used in numerous and varied systems where it is desirable allow a power source, such as a motor, to move a mechanical load, and prevent the mechanical load from back driving the power source when outside forces act on the load. For example, no-back devices are used in many aircraft flight control surface actuation systems. In these systems, the no-back devices allow a pilot to command various flight control surfaces such as spoilers, flaps, rudder or ailerons to a desired position, but prevents flight control surface movement from aerodynamic forces.

Numerous types of no-back devices have been developed over the years. While generally effective, many exhibit various drawbacks. For example, some devices are susceptible to chatter or ratcheting under operating conditions, which can lead to excessive wear and thus cause degraded performance, increased maintenance costs, and down-time. Some devices are relatively complex, heavy, and costly. Still others may not accommodate relatively large back driving torques, and thus may rely on a secondary device to ensure proper functionality under all conditions.

Hence, there is a need for a no-back device that is not susceptible to chatter or ratcheting and/or is relatively simple and lightweight by design and/or accommodates relatively large back driving torques. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a self-activated no-back device includes a housing, an input shaft, an output shaft, a reactor hub, a plurality of first grooves, a brake hub, a plurality of second grooves, a plurality of balls, a reactor plate, a brake pack, a reactor spring, and a load spring. The input shaft is rotationally mounted on the housing and is adapted to receive an input drive torque. The output shaft is rotationally mounted on the housing and is selectively engaged with the input shaft and is adapted to receive output load torque. The reactor hub surrounds a portion of the input shaft and is selectively rotatable therewith. The reactor hub has a reactor hub exterior side and a reactor hub interior side. A plurality of first grooves are formed in the reactor hub interior side, and each of the first grooves has at least one first cam surface. The brake hub is mounted on the output shaft and is rotatable therewith. The brake hub has a brake hub exterior side and a brake hub interior side. A plurality of second grooves are formed in the brake hub interior side. Each of the second grooves has at least one second cam surface, and each of the second grooves is aligned with a different one of the first grooves to define a plurality of groove pairs. Each of the plurality of balls is positioned in a different one of the groove pairs. The reactor plate is mounted within the housing and has a reactor plate interior side and a reactor plate exterior side. The reactor plate interior side contacts the reactor hub. The brake pack is mounted within the housing and is selectively contacted by the brake hub exterior side. The reactor spring is mounted within the housing and supplies a first spring force to the reactor plate. The load spring is mounted within the housing and supplies a second spring force to the brake pack.

In another embodiment, a self-activated no-back device includes a housing, an input shaft, an output shaft, a reactor hub, a plurality of first grooves, a brake hub, a plurality of second grooves, a plurality of balls, a reactor plate, a brake pack, a reactor spring, and a load spring. The input shaft is rotationally mounted on the housing and is adapted to receive an input drive torque. The output shaft is rotationally mounted on the housing and is selectively engaged with the input shaft and is adapted to receive output load torque. The reactor hub surrounds a portion of the input shaft and is selectively rotatable therewith. The reactor hub has a reactor hub exterior side and a reactor hub interior side. A plurality of first grooves are formed in the reactor hub interior side, and each of the first grooves has at least one first cam surface. The brake hub is mounted on the output shaft and is rotatable therewith. The brake hub has a brake hub exterior side and a brake hub interior side. A plurality of second grooves are formed in the brake hub interior side. Each of the second grooves has at least one second cam surface, and each of the second grooves is aligned with a different one of the first grooves to define a plurality of groove pairs. Each of the plurality of balls is positioned in a different one of the groove pairs. The reactor plate is mounted within the housing and has a reactor plate interior side and a reactor plate exterior side. The reactor plate interior side contacts the reactor hub. The brake pack is mounted within the housing and is selectively contacted by the brake hub exterior side. The brake pack includes a plurality of brake plates and a plurality of brake discs. Each brake disc is disposed between, and contacts, a different pair of the plurality of brake plates. The reactor spring is mounted within the housing and supplies a first spring force to the reactor plate that causes the reactor plate interior side to contact the reactor hub. The load spring is mounted within the housing and supplies a second spring force to the brake pack that causes each brake disc to contact the different pair of the plurality of brake plates. The brake hub exterior side contacts the brake pack when the balls are displaced a predetermined distance along the first and second cam surfaces.

In yet another embodiment, self-activated no-back device includes a housing a housing, an input shaft, an output shaft, a reactor hub, a plurality of first grooves, a brake hub, a plurality of second grooves, a plurality of balls, a reactor plate, and a brake pack. The input shaft is rotationally mounted on the housing and is adapted to receive an input drive torque. The output shaft is rotationally mounted on the housing and is selectively engaged with the input shaft and is adapted to receive output load torque. The reactor hub surrounds a portion of the input shaft and is selectively rotatable therewith. The reactor hub has a reactor hub exterior side and a reactor hub interior side. A plurality of first grooves are formed in the reactor hub interior side, and each of the first grooves has at least one first cam surface. The brake hub is mounted on the output shaft and is rotatable therewith. The brake hub has a brake hub exterior side and a brake hub interior side. A plurality of second grooves are formed in the brake hub interior side. Each of the second grooves has at least one second cam surface, and each of the second grooves is aligned with a different one of the first grooves to define a plurality of groove pairs. Each of the plurality of balls is positioned in a different one of the groove pairs. The reactor plate is mounted within the housing and has a reactor plate interior side and a reactor plate exterior side. The reactor plate interior side contacts the reactor hub. The brake pack is mounted within the housing and is selectively contacted by the brake hub exterior side. The brake pack includes a plurality of brake plates and a plurality of brake discs. Each brake disc is disposed between, and contacts, a different pair of the plurality of brake plates. Each brake plate is non-rotationally mounted in the housing and is axially movable relative to the housing, each brake disc is mounted on, and is rotatable with, the brake hub, each brake disc is axially movable relative to the brake hub, and the brake hub exterior side contacts the brake pack when the balls are displaced a predetermined distance along the first and second cam surfaces.

Furthermore, other desirable features and characteristics of the self-activated no-back device will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
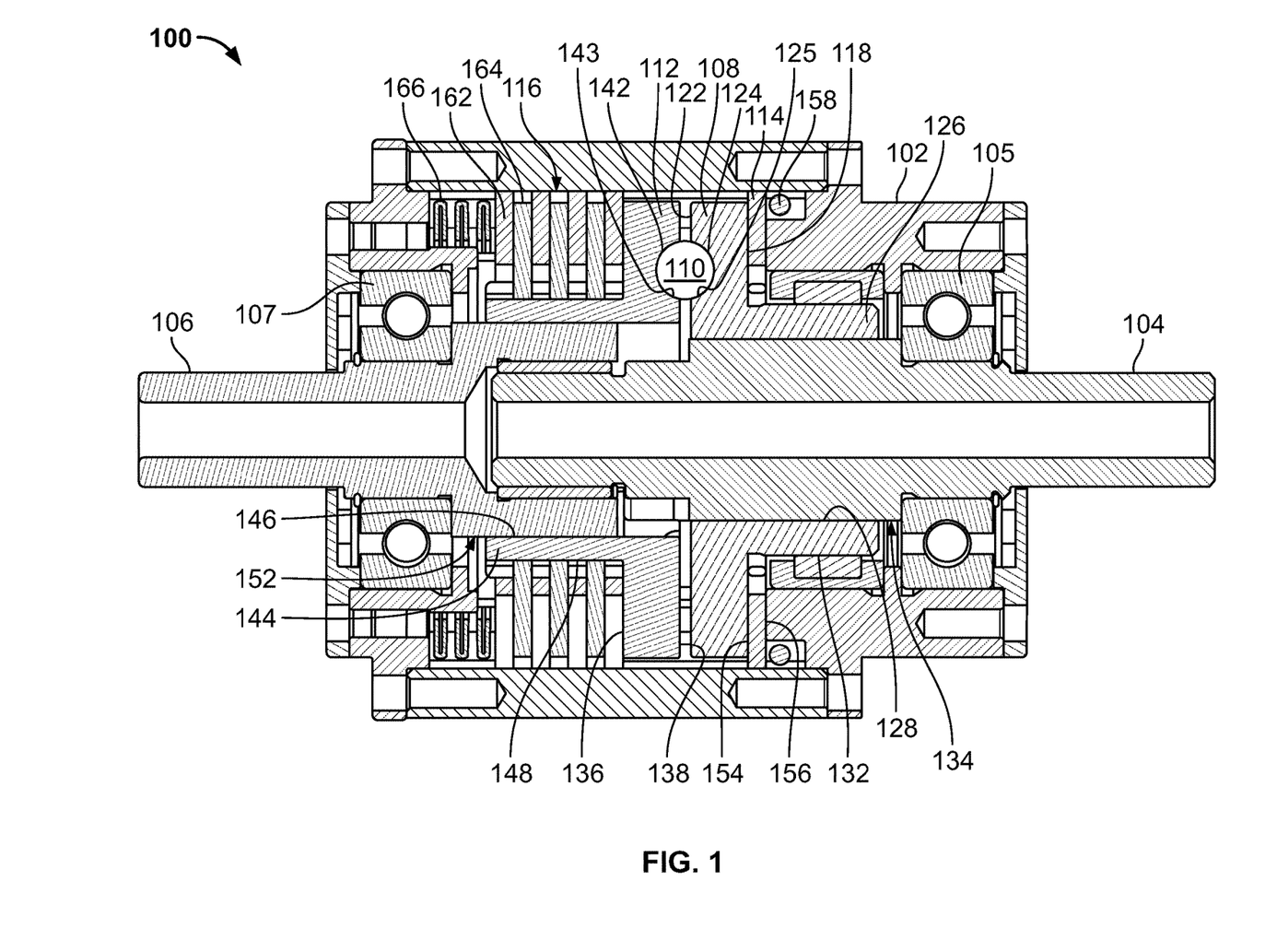
FIG. 1 depicts a cross section view of one embodiment of a self-activated no-back device.

Referring to FIG. 1, a cross section view of one embodiment of a self-activated no-back device 100 is depicted. The depicted device 100 includes a housing 102, an input shaft 104, an output shaft 106, a reactor hub 108, a plurality of balls 110, a brake hub 112, a reactor plate 114, and a brake pack 116. The housing 102, at least in the depicted embodiment, is an assembly of various parts but could, in other embodiments, be cast as a single component.

The input shaft 104 and the output shaft 106 are both rotationally mounted on the housing 102. In the depicted embodiment, the input shaft 104 is rotationally mounted on the housing 102 via a first bearing assembly 105, and the output shaft 106 is rotationally mounted on the housing 102 via a second bearing assembly 107. No matter how the input shaft 104 and output shaft 106 are rotationally mounted, the input shaft 104 is adapted to receive an input drive torque, and the output shaft 106 is adapted to receive an output load torque. It will be appreciated that the input drive torque supplied to the input shaft 104 may be supplied from any one of numerous types of non-illustrated devices that are operable to supply a drive torque. It will additionally be appreciated that the output load torque may be supplied to the output shaft 106 from any one of numerous types of non-illustrated loads that are operable to supply a torque to the output shaft 106.

Figure 2:
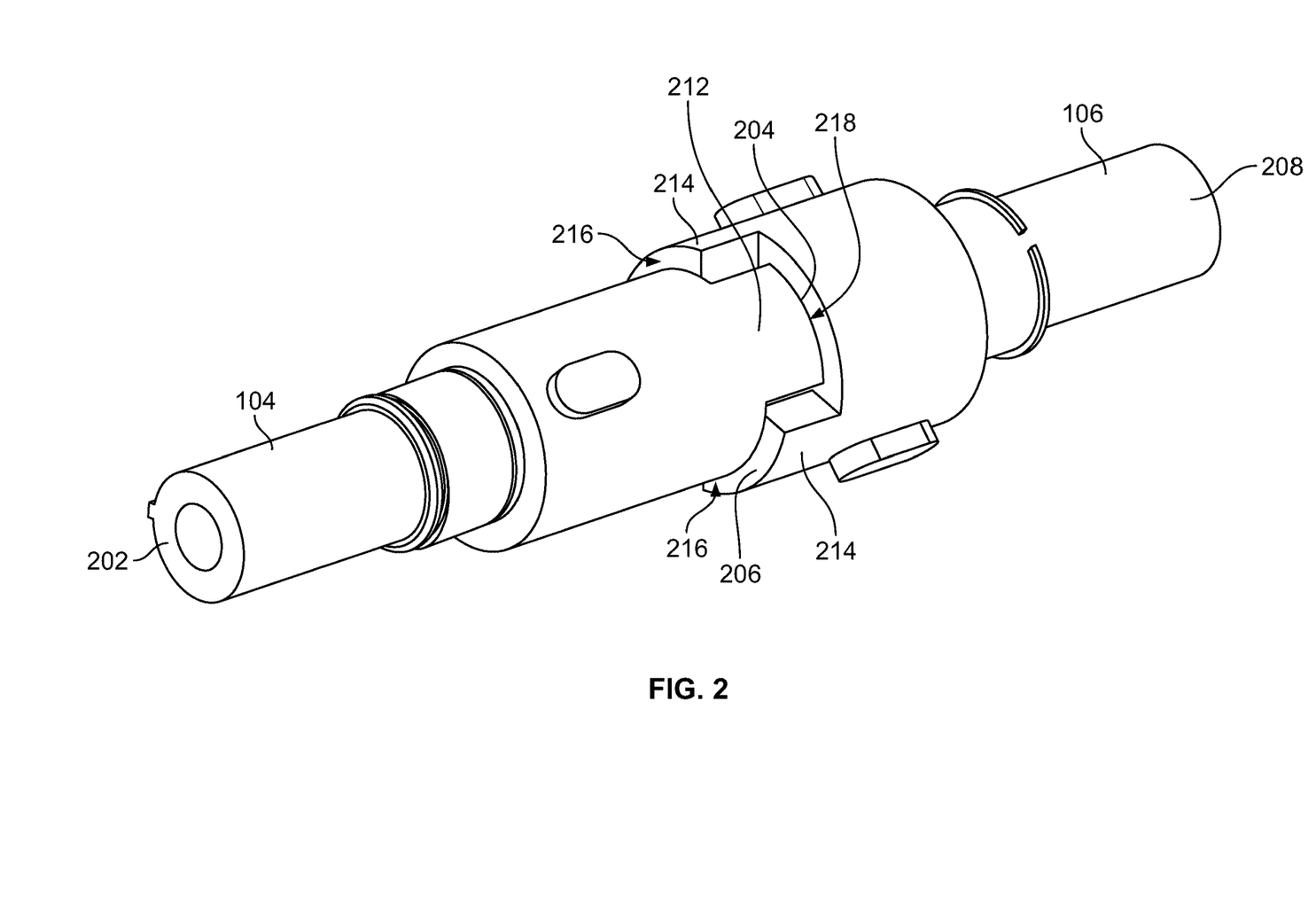
FIG. 2 depicts a plan view of the input shaft and output shaft of the no-back device of FIG. 1.

Regardless of the specific sources of the input drive torque and the output load torque, the input shaft 104 and output shaft 106 are configured such that the output shaft 106 is selectively engaged with the input shaft 104. To implement this functionality, and as FIG. 2 depicts more clearly, the input shaft 104 includes an input shaft first end 202 and an input shaft second end 204, and the output shaft 106 includes an output shaft first end 206 and an output shaft second end 208. The input shaft 104 and the output shaft 106 also each include a plurality of drive dogs. In particular, the input shaft second end 204 includes a plurality of input shaft drive dogs 212 (only one visible in FIG. 2) and the output shaft first end 206 includes a plurality of output shaft drive dogs 214.

The input shaft drive dogs 212 are spaced apart from each other by a first predetermined arc length to define a plurality of first gaps 216, and the output shaft drive dogs 214 are spaced apart from each other by a second predetermined arc length to define a plurality of second gaps 218 (only one visible in FIG. 2). As FIG. 2 also depicts, each input shaft drive dog 212 is disposed within a different one of the second gaps 218, and each output shaft drive dog 214 is disposed within a different one of the first gaps 216. The first gaps 216 and the second gaps 218 are dimensioned to allow a predetermined amount of relative rotation between the input shaft 104 and the output shaft 106. Although the depicted embodiment includes two input shaft drive dogs 212 and two output shaft drive dogs 214 and thus two first gaps 216 and two second gaps 218, it will be appreciated that the input shaft 104 and output shaft 106 could include more than this number of input shaft drive dogs 212 and output shaft drive dogs 214, respectively.

Returning now to FIG. 1, the reactor hub 108 surrounds a portion of the input shaft 104 and has a reactor hub exterior side 118 and a reactor hub interior side 122. A plurality of first grooves 124 are formed in the reactor hub interior side 122. Although only one first groove 124 is visible in FIG. 1, the plurality of first grooves 124 are visible in FIG. 3, which depicts both the reactor hub 108 and brake hub 112 in ghosted form. As will be described in more detail further below, each of the first grooves 124 has at least one first cam surface 125.

The reactor hub 108 is selectively rotatable with the input shaft 104. That is, at times, a predetermined amount of relative rotation may occur between the input shaft 104 and reactor hub 108. To implement this, it is seen that the reactor hub 108, at least in the depicted embodiment, includes a reactor hub cylindrical portion 126 that extends axially from the reactor hub exterior side 118. The reactor hub cylindrical portion 126 has an inner surface 128 and an outer surface 132. The inner surface 128 defines an input shaft opening 134 through which the input shaft 104 extends. As shown more clearly in FIGS. 3 and 4, the inner surface 128 also has a key pocket 402 formed therein. Additionally, the input shaft 104 includes an input shaft key 404 that protrudes radially therefrom. The input shaft key 404 is disposed within the key pocket 402. The key pocket 402 and the input shaft key 404 are dimensioned to allow the predetermined amount of relative rotation between the input shaft 104 and the reactor hub 108. The purpose for this will be described further below.

Returning again to FIG. 1, the brake hub 112 is mounted on, and is rotatable with, the output shaft 106 and has a brake hub exterior side 136 and a brake hub interior side 138. A plurality of second grooves 142 are formed in the brake hub interior side. Although only one second groove 142 is visible in FIG. 1, the plurality of second grooves 124 are visible in FIG. 3. As FIG. 3 also depicts, each of the second grooves 142 is aligned with a different one of the first grooves 124 to define a plurality of groove pairs. As will also be described further below, each of the second grooves 142 has a second cam surface 143.

Figure 5:
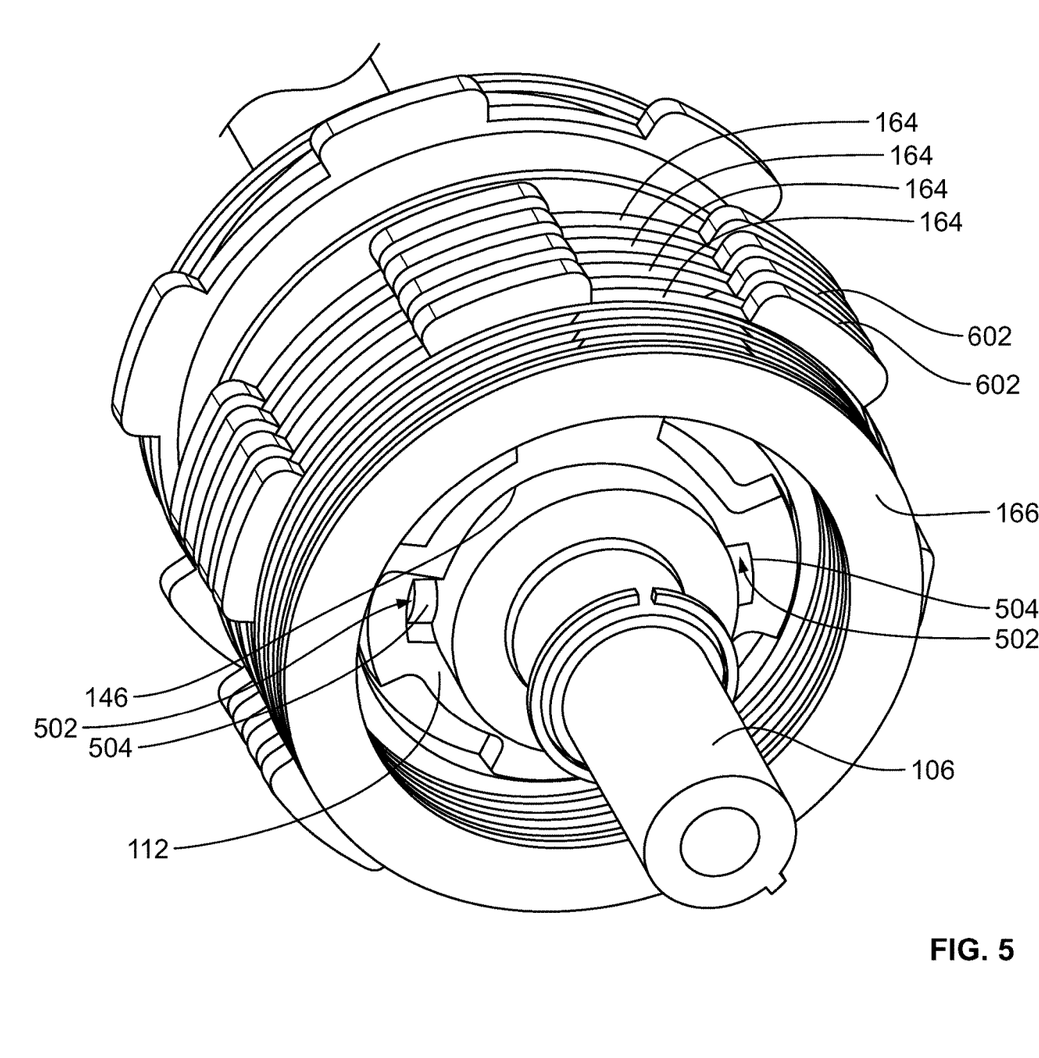
FIG. 5 depicts a plan view of another portion of the no-back device of FIG. 1 more clearly illustrating certain other interface features.

Although the brake hub 112 is rotatable with the output shaft 106, it is also axially movable relative to the output shaft 106. To implement this, the brake hub 112 includes a brake hub cylindrical portion 144 that extends axially from the brake hub exterior surface 136. The brake hub cylindrical portion 144 has inner surface 146 and an outer surface 148. The inner surface 146 defines an output shaft opening 152 through which the output shaft 106 extends. As shown more clearly in FIG. 5, the inner surface 146 has a plurality of grooves 502 formed therein, and the output shaft 106 has a plurality of splines 504 formed on a portion thereof. Each spline 504 is disposed within a different one of the grooves 502 and allows the brake hub 112 to move axially relative to the output shaft 106. Although two grooves 502 and two splines 504 are depicted, it will be appreciated that the brake hub 112 and output shaft 106 could include more than this number of grooves 502 and splines 504, respectively.

Returning again to FIG. 1, the reactor plate 114 is mounted within the housing 102 and has a reactor plate interior side 154 and a reactor plate exterior side 156. The reactor plate interior side 154 contacts the reactor hub 108, and more specifically the reactor hub exterior side 118, and supplies a continuous friction force to the reactor hub 108. In the depicted embodiment, a reactor spring 158, which is mounted within the housing, supplies a first spring force to the reactor plate 114, which causes the reactor plate 114 to contact the reactor hub 108. One embodiment of the reactor spring 158 is shown even more clearly in FIG. 4.

The brake pack 116 is mounted within the housing 102 and is selectively contacted by the brake hub exterior side 136, and thus stops the rotation of the brake hub 112 and, concomitantly, the output shaft 106. Although the brake pack 116 may be variously configured and implemented, in the depicted embodiment the brake pack 116 includes a plurality of brake plates 162 and a plurality of brake discs 164. Each brake disc 164 is disposed between, and continuously contacts, a different pair of the plurality of brake plates 162. A load spring 166, which is mounted within the housing 102, supplies a second spring force to the brake pack 116, which causes each brake disc 164 to continuously contact the different pair of brake plates 162. One embodiment of the load spring 166 is shown even more clearly in FIG. 5.

Figure 6:
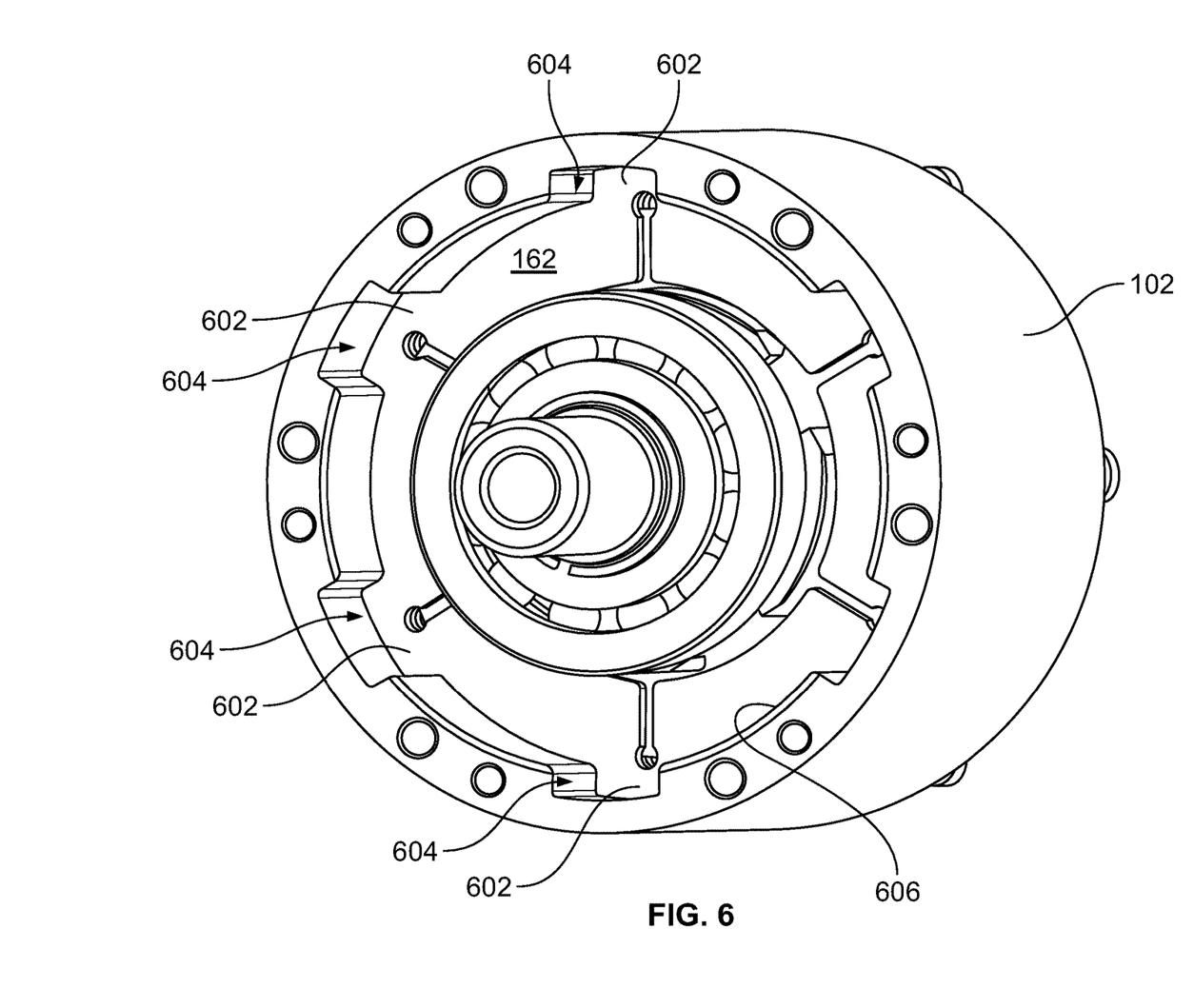
FIG. 6 depicts a plan view of yet another portion of the no-back device of FIG. 1 more clearly illustrating certain other interface features.
Figure 7:
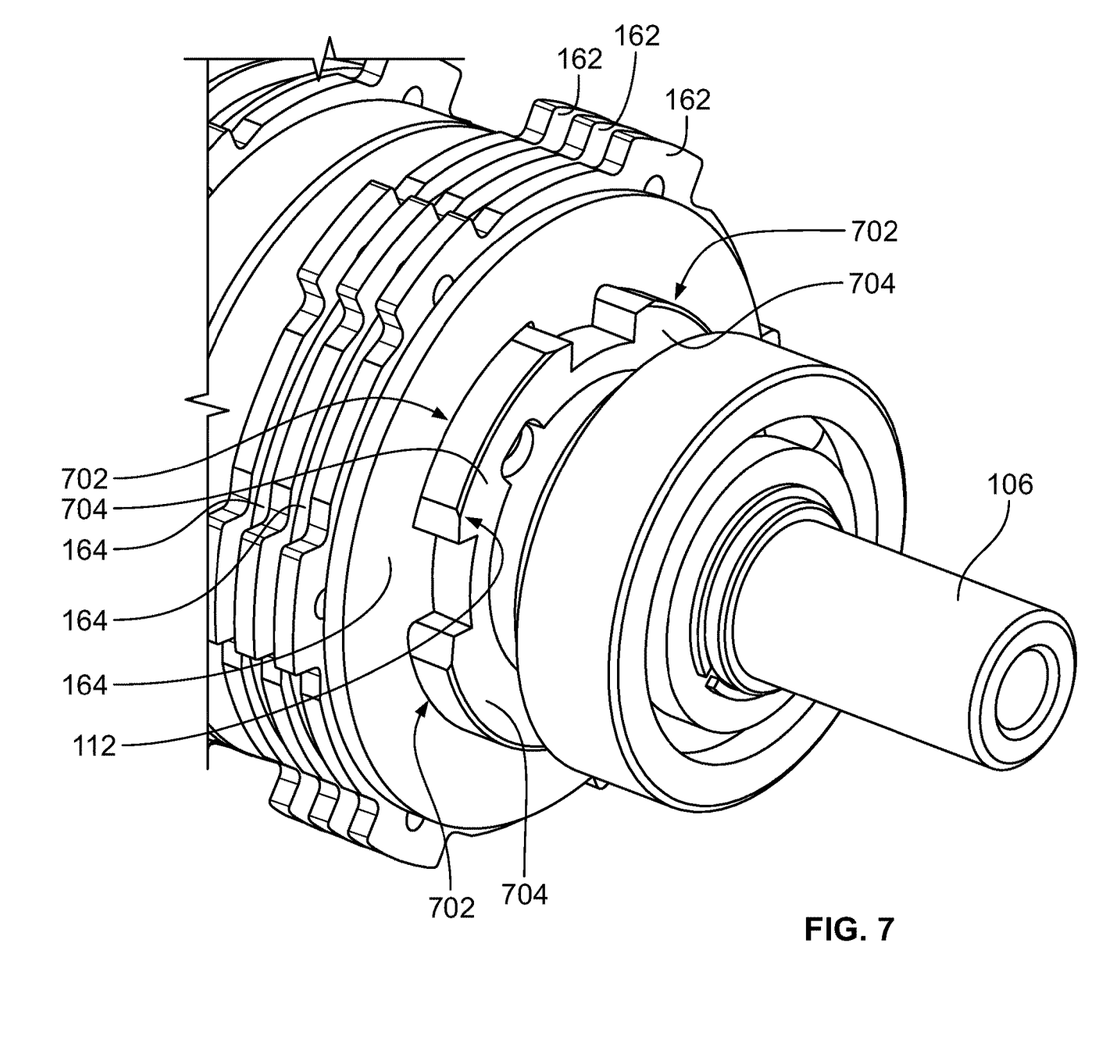
FIG. 7 depicts a plan view of still another portion of the no-back device of FIG. 1 more clearly illustrating certain other interface features.

In addition to the above, it is noted that each brake plate 162 is non-rotationally mounted in the housing 102 and is axially movable relative to the housing 102. Moreover, each brake disc 164 is mounted on, and is rotatable with, the brake hub 112, while also being axially movable relative to the brake hub 112. To implement this, and as shown more clearly in FIGS. 6 and 7, each brake plate 162 has a plurality of protrusions 602 extending radially therefrom, and each protrusion 602 is disposed within a different one of a plurality of housing grooves 604 that are formed in a portion of an inner surface 606 of the housing 102. Additionally, each brake disc 164 has a plurality of brake disc grooves 702 formed therein, and the outer surface 148 of the brake hub cylindrical portion 144 has a plurality of splines 704 formed on a portion thereof. Each of the splines 704 is disposed within a different one of the brake disc grooves 702 and allows the brake discs 164 to move axially relative to the brake hub 112.

It was previously noted that each of the first grooves 124 has at least one first cam surface 125, and that each of the second grooves 142 has at least one second cam surface 143. It was also noted that each of the second grooves 142 is aligned with a different one of the first grooves 124 to define a plurality of groove pairs. It should be noted that although six first grooves 124 and six second grooves 142 are included in the depicted embodiment, this number of grooves 124, 142 is merely exemplary, and that other numbers, both less than or greater than six, may be included in the reactor hub 108 and brake hub 112. Additionally, while the reactor hub 108 and brake hub 112 are depicted as having the same number of grooves 124, 142, it will be appreciated that this is also not necessary, and that each hub 108, 112 may have differing numbers of grooves. Preferably, however, the reactor hub 108 has at least two first grooves 124 that are substantially aligned with two second grooves 142 on the brake hub 112, to define two groove pairs.

Figure 3:
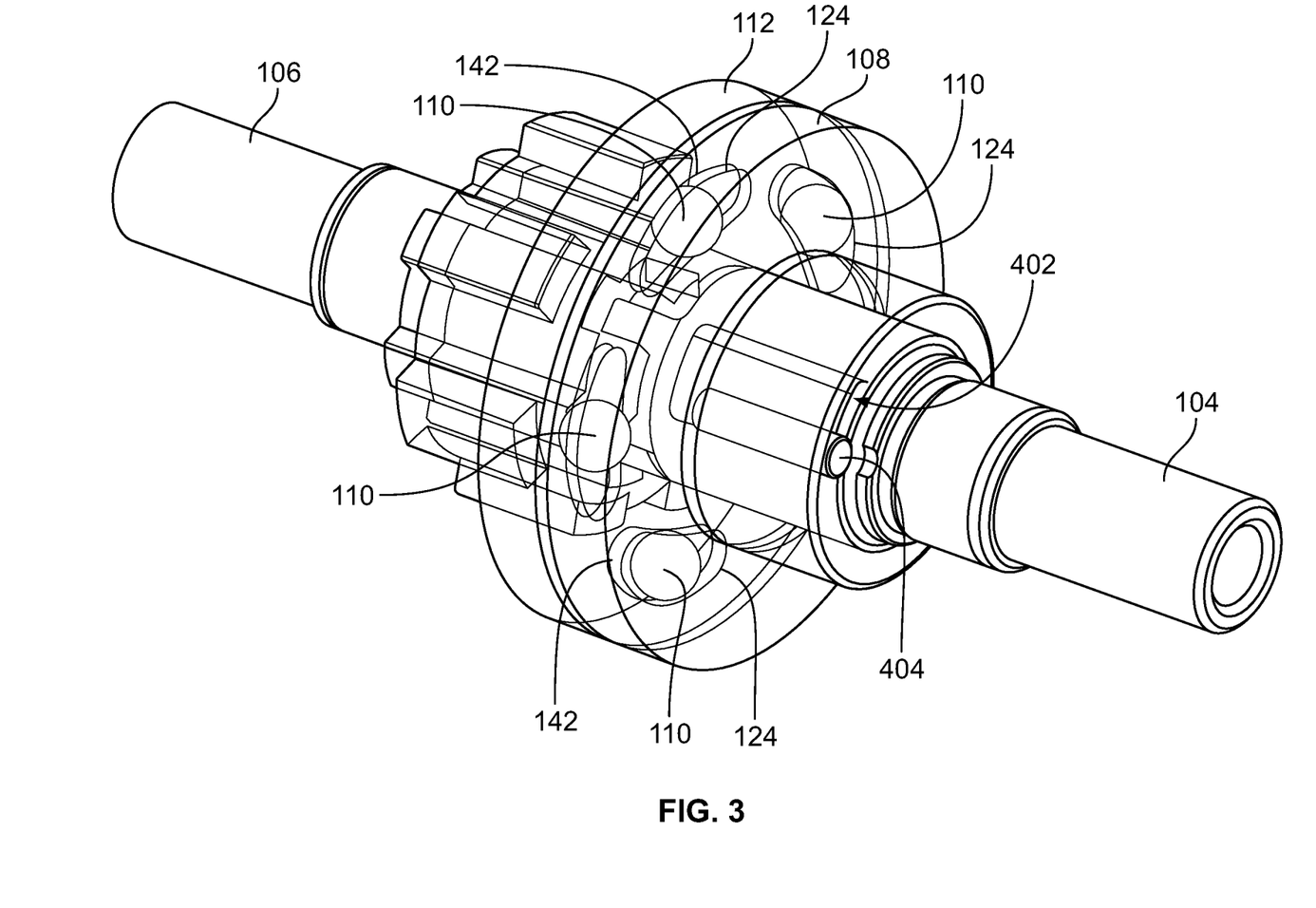
FIG. 3 depicts a plan view of portion of the no-back device of FIG. 1 with the reactor hub and brake hub shown in ghosted form.
Figure 4:
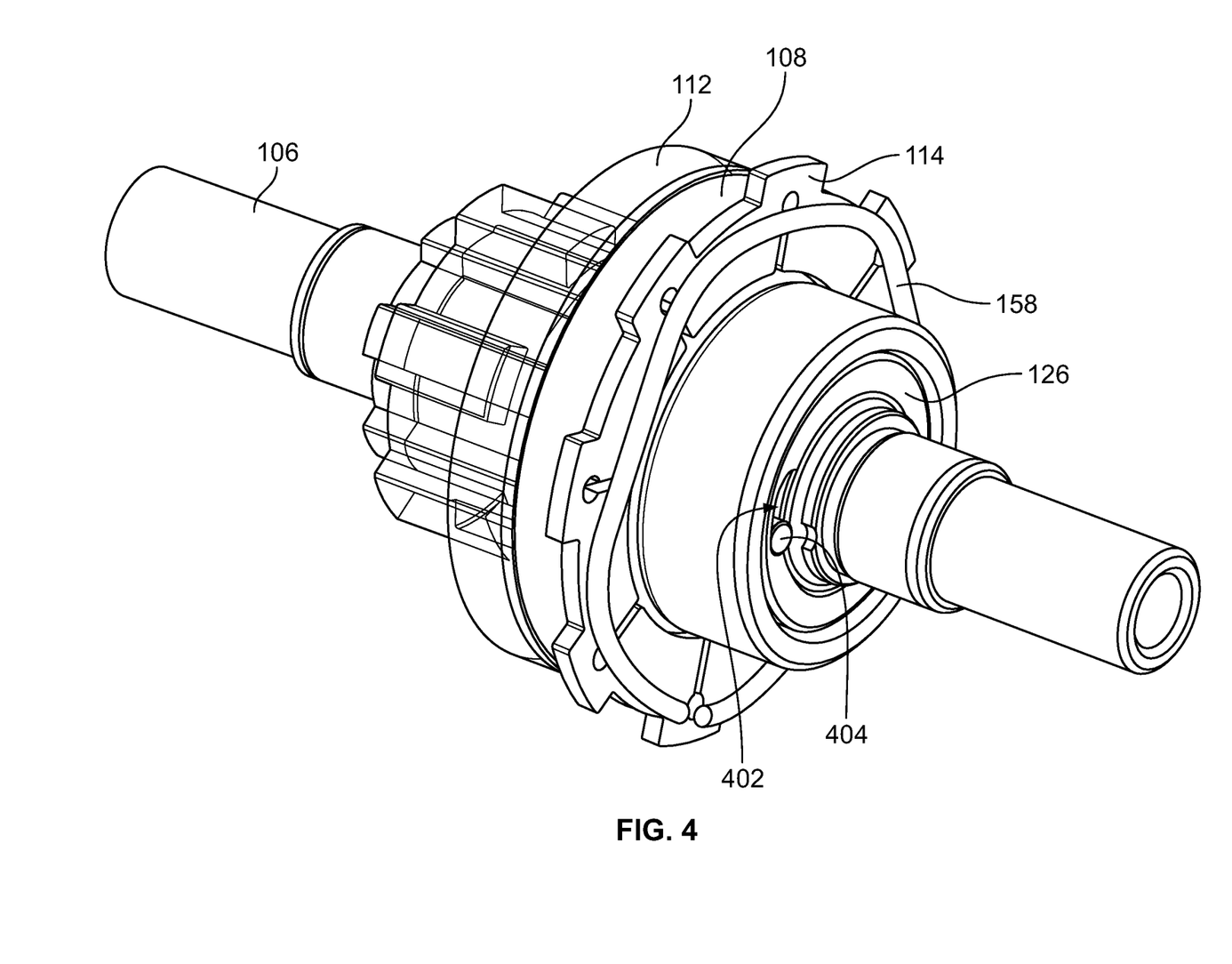
FIG. 4 depicts a plan view of a portion of the no-back device of FIG. 1 more clearly illustrating certain interface features.

No matter the number of first and second grooves 124, 142, and thus no matter the number of groove pairs, it is within the groove pairs that the plurality of balls 110 are disposed. In particular, as FIGS. 1 and 3 depict, each ball 110 is positioned in a different one of the groove pairs. The nominal position of each ball 110, which is the position depicted in FIGS. 1 and 3, is when each ball 110 is positioned at the lowest point of the first and second grooves 124, 142 that define its associated groove pair. As will be described momentarily, under certain conditions, the balls 110 may be displaced along the first and second cam surfaces 125, 143. As will also be described momentarily, the brake hub exterior side 136 will contact the brake pack 116 when the balls 110 are displaced a predetermined distance along the first and second cam surfaces 125, 143.

Before proceeding further, it was previously noted that the first and second gaps 216, 218, which are defined by the input and output shaft drive dogs 212, 214, are dimensioned to allow a predetermined amount of relative rotation between the input shaft 104 and the output shaft 106, and that key pocket 402 and the input shaft key 404 are dimensioned to allow the predetermined amount of relative rotation between the input shaft 104 and the reactor hub 108. It will be appreciated that these dimensions are such that when each of balls 110 is in the nominal position, the input and output shaft drive dogs 212, 214 are in contact, and simultaneously the key pocket 402 and the input shaft key 404 are in contact.

Figure 8A:
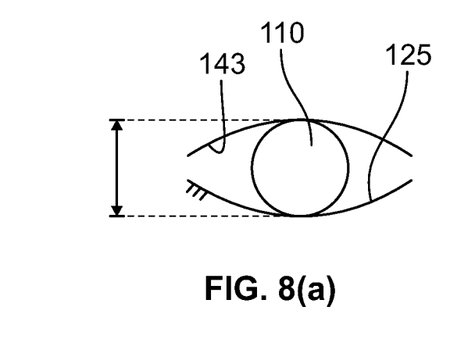
FIGS. 8(a)-8(c) depict one configuration of a groove pair that may be used to configure the no-back device of FIG. 1 for bidirectional operation.
Figure 8B:
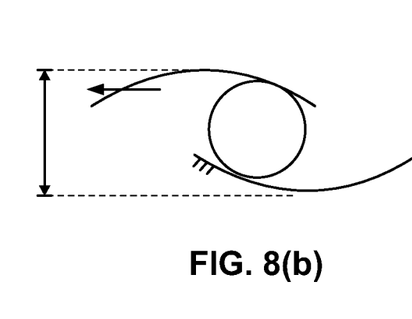
Figure 8C:
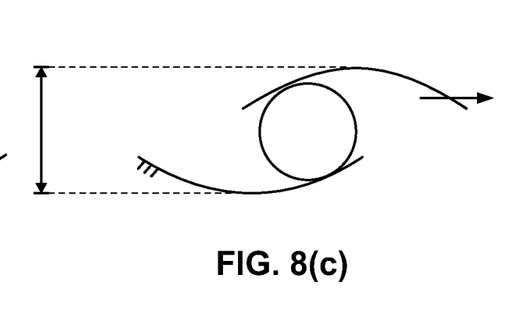
Figure 9A:
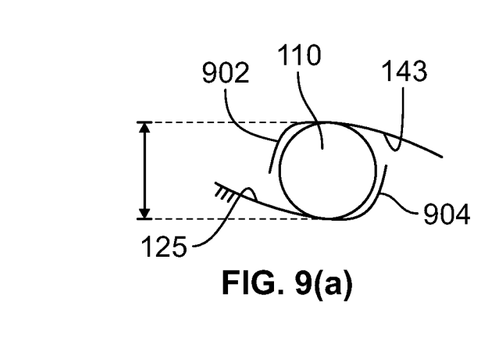
FIGS. 9(a)-9(c) depict one configuration of a groove pair that may be used to configure the no-back device of FIG. 1 for unidirectional operation.
Figure 9B:
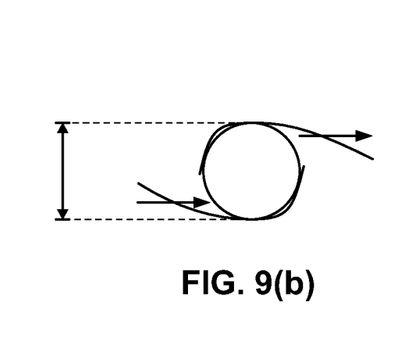
Figure 9C:
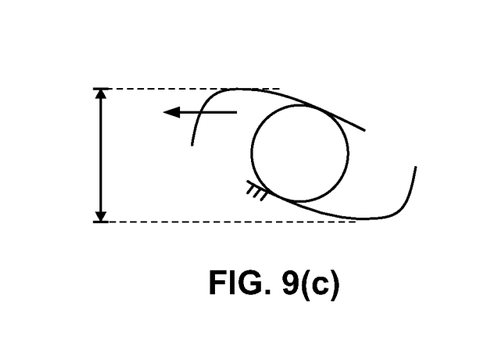

The self-activated no-back device 100 may be configured as a bidirectional device or as a unidirectional device, depending upon the configuration of the first and second cam surfaces 125, 143. When configured as a bidirectional device, the first and second cam surfaces 124, 142 allow the balls 110 to be displaced in two rotational directions. When configured as a unidirectional device, the first and second cam surfaces 125, 143 allow the balls 100 to be displaced in only one rotational direction. One example of the configuration of the first and second cam surfaces 125, 143 for bidirectional operation is depicted in FIGS. 8(*a*)-8(*c*), and one example of the configuration of the first and second cam surfaces 125, 143 for unidirectional operation is depicted in FIGS. 9(*a*)-9(*c*). As FIGS. 8(*a*)-8(*c*) depict, for bidirectional operation, the first and second grooves 124, 142 each include two cam surfaces 125, 143, respectively. Conversely, as depicted in FIGS. 9(*a*)-9(*c*), for unidirectional operation, the first and second grooves 124, 142 each include only a cam surface 125, 143, respectively. The first and second grooves 124, 142 also include a first and second shoulder 902, 904, respectively, to limit the motion of the balls 110 to only a single direction.

Having described the structure of the self-activated no-back device 100 in detail, a more detailed description of the operation of the device 100 will no be provided. In doing so, it is noted that the device 100, whether configured as a bidirectional or unidirectional device, is configured to operate in two different operating regimes—an actuation regime and a holding regime—each of which will now be described.

Actuation Regime

In the actuation regime, the device 100 may freely rotate in both rotational directions when it is driven by the non-illustrated torque supply device (e.g., motor). That is, the torque supplied from the non-illustrated torque supply device (e.g., a motor) to the input shaft 104 is transferred directly to the non-illustrated load via the output shaft 106.

More specifically, while operating in the actuation regime, the balls 110 are in the nominal position. Thus, as mentioned above, the input and output shaft drive dogs 212, 214 are in contact, and simultaneously the key pocket 402 and the input shaft key 404 are in contact. This means that the reactor hub 108 rotates with the input shaft 104, and the torque supplied to the input shaft 104 is transferred to the output shaft 106. Because of the configuration of the output shaft 106, the brake hub 112, and the brake discs 116, the components rotate synchronously. Moreover, because the balls 110 are in the position, the brake hub 112 is in its nominal position (see FIG. 1), which is defined by the preload of the reactor spring 158 and the load spring 166.

Holding Regimes

The device 100 will operate in the holding regime when a torque supplied from the non-illustrated load exceeds the torque (if any) being supplied from the non-illustrated torque supply device by a predetermined amount. The device 100 self-activates the brake pack 116 and diverts the torque acting on output shaft 106 into the housing 102. As a result, the torque is not transferred to input shaft 104 and thus not back to the torque supply device. When configured for bidirectional operation, the holding regime is activated for both rotational directions of the external torque. When configured for unidirectional operation, the holding regime is activated only in one rotational direction. In the other rotational direction, the torque is allowed to pass through the device 100 and back-drive the torque supply device. Each of these different holding regimes will now be described in more detail Holding Regime for Bidirectional Operation When a load torque supplied from the non-illustrated load exceeds the torque (if any) being supplied from the non-illustrated torque supply device by a predetermined amount, the limited relative rotation between the input shaft 104 and the reactor hub 108 allows the reactor hub 108 to maintain its position. This is due to the friction induced by its contact with reactor plate 114. The rotation of the output shaft 106, and thus the brake hub 112, causes the brake hub 112 to rotate relative to the reactor hub 108. This causes a displacement of each of the groove pairs, which in turn causes the balls 110 to roll from the nominal positions (FIG. 8(*a*)) along the cam surfaces 125, 143 (FIG. 8(*b*) or 8(*c*)). This, in turn, urges the brake hub 112 axially away from the reactor hub 108. This axial displacement of the brake hub 112 increases the friction in the brake pack 116, reacts against the external torque.

It should be noted that during the transition from the actuation regime to the holding regime, the output shaft 106 rotates in the direction of the load torque by a predetermined maximum rotational displacement. This maximum rotation can be controlled by the stiffness characteristics of the load spring 166 to induce the friction against external torque load.

When in the holding regime, if the torque supply device is commanded to start driving the device 100 in the opposite direction of the load torque, the device 100 will be released from the holding regime. This is accomplished when the torque supplied from the torque supply device to the input shaft 104 is transmitted, via the input and output shaft drive dogs 212, 214, to the brake hub 112. This again causes the brake hub 112 to rotate relative to the reactor hub 108, but in the opposite direction. This decreases the displacement of each of the groove pairs, which in turn causes the balls 110 to roll back to the nominal positions (FIG. 8(*a*)).

When in the holding regime, if the torque supply device is commanded to start driving the device 100 in the same direction as the load torque, the torque supplied to the input shaft 104 is transferred to the reactor hub 108. This causes the reactor hub 108 to rotate relative to the brake hub 112. This decreases the displacement of each of the groove pairs, which in turn causes the balls 110 to roll back to the nominal positions (FIG. 8(*a*). The load spring 166 moves the brake hub 112 back to its nominal position, decreasing the preload of both the reactor spring 158 and load spring 166. The torque is then transmitted from the input shaft 104 to the output shaft 106 through the drive dogs 212, 214.

If the load torque were to suddenly change its direction while the device 100 is operating in the actuation regime and start acting in the same direction as torque supply device, it could cause the output shaft 106 to rotate faster than the input shaft 104. This, too, would cause a displacement of each of the groove pairs, which in turn would cause the balls 110 to roll from the nominal positions (FIG. 8(*a*)) along the cam surfaces 125, 143 (FIG. 8(*b*) or 8(*c*)). This would urge the brake hub 112 axially away from the reactor hub 108 and increase the friction in the brake pack 116.

Holding Regime for Unidirectional Operation

When a load torque supplied from the non-illustrated load exceeds the torque (if any) being supplied from the non-illustrated torque supply device by a predetermined amount and in the particular direction in which the device 100 is configured to hold the load, the operation of the device 100 is the same as for bidirectional operation. That is, the limited relative rotation between the input shaft 104 and the reactor hub 108 allows the reactor hub 108 to maintain its position. This is due to the friction induced by its contact with reactor plate 114. The rotation of the output shaft 106, and thus the brake hub 112, causes the brake hub 112 to rotate relative to the reactor hub 108. This causes a displacement of each of the groove pairs, which in turn causes the balls 110 to roll from the nominal positions (FIG. 9(*a*)) along the cam surfaces 125, 143 (FIG. 9(*c*)). This, in turn, urges the brake hub 112 axially away from the reactor hub 108. This axial displacement of the brake hub 112 increases the friction in the brake pack 116, reacts against the external torque.

As with the bidirectional operation, during the transition from the actuation regime to the holding regime, the output shaft 106 rotates in the direction of the load torque by a predetermined maximum rotational displacement. This maximum rotation can be controlled by the stiffness characteristics of the load spring 166 to induce the friction against external torque load.

When in the holding regime, if the torque supply device is commanded to start driving the device 100 in the opposite direction of the load torque, the device 100 will be released from the holding regime. This is accomplished when the torque supplied from the torque supply device to the input shaft 104 is transmitted, via the input and output shaft drive dogs 212, 214, to the brake hub 112. This again causes the brake hub 112 to rotate relative to the reactor hub 108, but in the opposite direction. This decreases the displacement of each of the groove pairs, which in turn causes the balls 110 to roll back to the nominal positions (FIG. 9(*a*)).

When in the holding regime, if the torque supply device is commanded to start driving the device 100 in the same direction as the load torque, the torque supplied to the input shaft 104 is transferred to the reactor hub 108. This causes the reactor hub 108 to rotate relative to the brake hub 112. This decreases the displacement of each of the groove pairs, which in turn causes the balls 110 to roll back to the nominal positions (FIG. 8(*a*)). The load spring 166 moves the brake hub 112 back to its nominal position, decreasing the preload of both the reactor spring 158 and load spring 166. The torque is then transmitted from the input shaft 104 to the output shaft 106.

Backdriving for Unidirectional Operation

If a load torque is supplied to the device in a direction in which back-driving is allowed (see FIG. 9(*b*)), the balls 110 contact the first and second shoulder 902, 904. As a result, torque is transferred to the reactor hub 108, which begins rotating when it overcomes the friction of the reactor plate 114. Simultaneously, because the input and output shaft drive dogs 212, 214 are engaged, the load torque is transferred through the input shaft 104 to the torque supply device.

The self-activated no-back device 100 described herein is not susceptible to chatter or ratcheting and/or is relatively simple and lightweight and/or accommodates relatively large back driving torques. It can also be configured for unidirectional or bidirectional operation.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A self-activated no-back device, comprising:
a housing;
an input shaft rotationally mounted on the housing and adapted to receive an input drive torque;
an output shaft rotationally mounted on the housing, the output shaft selectively engaged with the input shaft and adapted to receive output load torque;

a reactor hub surrounding a portion of the input shaft and selectively rotatable therewith, the reactor hub having a reactor hub exterior side and a reactor hub interior side;

a plurality of first grooves formed in the reactor hub interior side, each of the first grooves having at least one first cam surface;

a brake hub mounted on the output shaft and rotatable therewith, the brake hub having a brake hub exterior side and a brake hub interior side;

a plurality of second grooves formed in the brake hub interior side, each of the second grooves having at least one second cam surface, and each of the second grooves aligned with one of the plurality of first grooves to define a plurality of groove pairs;

a plurality of balls, each ball positioned in one of the plurality of groove pairs;

a reactor plate mounted within the housing and having a reactor plate interior side and a reactor plate exterior side, the reactor plate interior side contacting the reactor hub;

a brake pack mounted within the housing and selectively contacted by the brake hub exterior side;

a reactor spring mounted within the housing and supplying a first spring force to the reactor plate; and a load spring mounted within the housing and supplying a second spring force to the brake pack.

2. The device of claim 1, wherein the brake hub exterior side contacts the brake pack when the balls are displaced a predetermined distance along the at least one first and second cam surfaces.

3. The device of claim 2, wherein the at least one first and second cam surfaces allow the balls to be displaced in only one rotational direction.

4. The device of claim 2, wherein the at least one first and second cam surfaces allow the balls to be displaced in two rotational directions.

5. The device of claim 1, wherein:
the input shaft includes an input shaft first end and an input shaft second end, the input shaft second end including a plurality of input shaft drive dogs, each input shaft drive dog spaced apart from each other by a first predetermined arc length to define a plurality of first gaps;
the output shaft includes an output shaft first end and an output shaft second end, the output shaft first end including a plurality of output shaft drive dogs, each output shaft drive dog spaced apart from each other by a second predetermined arc length to define a plurality of second gaps;
each input shaft drive dog is disposed within one of the plurality of second gaps; and
each output shaft drive dog is disposed within one of the plurality of first gaps.

6. The device of claim 5, wherein the first gaps and the second gaps are dimensioned to allow a predetermined amount of relative rotation between the input shaft and the output shaft.

7. The device of claim 1, wherein:
the reactor hub includes a reactor hub cylindrical portion that extends axially from the reactor hub exterior side, the reactor hub cylindrical portion having an inner surface and an outer surface, the inner surface defining an input shaft opening through which the input shaft extends, the inner surface having a key pocket formed therein; and
the input shaft includes an input shaft key, the input shaft key protruding radially from the input shaft and disposed within the key pocket, whereby the reactor hub may move axially relative to the input shaft.

8. The device of claim 7, wherein the key pocket and the input shaft key are dimensioned to allow a predetermined amount of relative rotation between the input shaft and the reactor hub.

9. The device of claim 1, wherein:
the brake hub includes a brake hub cylindrical portion that extends axially from the brake hub exterior side, the brake hub cylindrical portion having inner surface and an outer surface, the inner surface defining an output shaft opening through which the output shaft extends, the inner surface having a plurality of grooves formed therein; and
the output shaft has a plurality of splines formed on a portion thereof, each spline disposed within one of the plurality of grooves, whereby the brake hub may move axially relative to the output shaft.

10. The device of claim 1, wherein:
the brake pack comprises a plurality of brake plates and a plurality of brake discs; and
each brake disc is disposed between, and contacts, a pair of the plurality of brake plates.

11. The device of claim 10, wherein:
each brake plate is non-rotationally mounted in the housing and is axially movable relative to the housing; and
each brake disc is mounted on, and is rotatable with, the brake hub.

12. The device of claim 11, wherein each brake disc is axially movable relative to the brake hub.

13. A self-activated no-back device, comprising:
a housing;
an input shaft rotationally mounted on the housing and adapted to receive an input drive torque;
an output shaft rotationally mounted on the housing, the output shaft selectively engaged with the input shaft and adapted to receive output load torque;
a reactor hub surrounding a portion of the input shaft and selectively rotatable therewith, the reactor hub having a reactor hub exterior side and a reactor hub interior side;
a plurality of first grooves formed in the reactor hub interior side, each of the first grooves having a first cam surface;
a brake hub mounted on the output shaft and rotatable therewith, the brake hub having a brake hub exterior side and a brake hub interior side;
a plurality of second grooves formed in the brake hub interior side, each of the second grooves having a second cam surface, and each of the second grooves aligned with one of the plurality of first grooves to define a plurality of groove pairs;
a plurality of balls, each ball positioned in a different one of the groove pairs;
a reactor plate mounted within the housing and having a reactor plate interior side and a reactor plate exterior side, the reactor plate interior side contacting the reactor hub;
a brake pack mounted within the housing and selectively contacted by the brake hub exterior side, the brake pack comprising a plurality of brake plates and a plurality of brake discs, each brake disc is disposed between, and contacting, a pair of the plurality of brake plates;

a reactor spring mounted within the housing and supplying a first spring force to the reactor plate that causes the reactor plate interior side to contact the reactor hub; and a load spring mounted within the housing and supplying a second spring force to the brake pack that causes each brake disc to contact the pair of the plurality of brake plates, wherein the brake hub exterior side contacts the brake pack when the balls are displaced a predetermined distance along the first and second cam surfaces.

14. The device of claim 13, wherein the first and second cam surfaces allow the balls to be displaced in only one rotational direction.

15. The device of claim 13, wherein the first and second cam surfaces allow the balls to be displaced in two rotational directions.

16. The device of claim 13, wherein:

the input shaft includes an input shaft first end and an input shaft second end, the input shaft second end including a plurality of input shaft drive dogs, each input shaft drive dog spaced apart from each other by a first predetermined arc length to define a plurality of first gaps;

the output shaft includes an output shaft first end and an output shaft second end, the output shaft first end including a plurality of output shaft drive dogs, each output shaft drive dog spaced apart from each other by a second predetermined arc length to define a plurality of second gaps;

each input shaft drive dog is disposed within one of the second gaps; and each output shaft drive dog is disposed within one of the first gaps, wherein the first gaps and the second gaps are dimensioned to allow a predetermined amount of relative rotation between the input shaft and the output shaft.

17. The device of claim 13, wherein:

the reactor hub includes a reactor hub cylindrical portion that extends axially from the reactor hub exterior side, the reactor hub cylindrical portion having an inner surface and an outer surface, the inner surface defining an input shaft opening through which the input shaft extends, the inner surface having a key pocket formed therein; and the input shaft includes an input shaft key, the input shaft key protruding radially from the input shaft and disposed within the key pocket, wherein the key pocket and the input shaft key are dimensioned to allow a predetermined amount of relative rotation between the input shaft and the reactor hub.

18. The device of claim 13, wherein:

the brake hub includes a brake hub cylindrical portion that extends axially from the brake hub exterior side, the brake hub cylindrical portion having inner surface and an outer surface, the inner surface defining an output shaft opening through which the output shaft extends, the inner surface having a plurality of grooves formed therein; and the output shaft has a plurality of splines formed on a portion thereof, each spline disposed within one of the plurality of grooves, whereby the brake hub may move axially relative to the output shaft.

19. The device of claim 13, wherein:

each brake plate is non-rotationally mounted in the housing and is axially movable relative to the housing;

each brake disc is mounted on, and is rotatable with, the brake hub; and each brake disc is axially movable relative to the brake hub.

* * * * *